United States Patent [19]

Pereira

[11] Patent Number: 5,781,726
[45] Date of Patent: Jul. 14, 1998

[54] MANAGEMENT OF POLLING TRAFFIC IN CONNECTION ORIENTED PROTOCOL SESSIONS

[75] Inventor: Frank R. Pereira, Pleasanton, Calif.

[73] Assignee: 3Com Corporation, Santa Clara, Calif.

[21] Appl. No.: 594,878

[22] Filed: Jan. 31, 1996

[51] Int. Cl.[6] .......................... G06F 13/14; H04L 12/28; H04J 3/00
[52] U.S. Cl. ................... 395/200.3; 395/200.48; 395/200.57; 395/200.68; 395/200.79; 395/200.8; 364/229; 364/240.8; 364/241.1; 364/242.94; 364/284.4; 370/346; 370/355; 370/356; 370/449; 370/452; 370/469; 340/825.08; 340/825.06
[58] Field of Search ............................ 395/200.3, 200.47, 395/200.55, 200.5, 200.57, 200.68, 200.8, 280, 285, 200.48, 200.79, 311; 364/240.8, 241.1, 241.8, 242, 242.1, 242.94, 242.96, 283.3, 284.4, DIG. 1-2, 229; 370/229, 231, 351, 355, 356, 369, 386, 396, 412, 449, 450, 452, 458, 459, 460, 902, 909; 340/825.08, 825.06; 375/257, 258, 346, 401-405

[56] References Cited

U.S. PATENT DOCUMENTS

| | | | |
|---|---|---|---|
| 5,237,693 | 8/1993 | Kiyohara et al. | 395/200.01 |
| 5,303,238 | 4/1994 | Bordd et al. | 370/402 |
| 5,309,437 | 5/1994 | Perlman et al. | 370/401 |
| 5,341,498 | 8/1994 | Connor et al. | 395/615 |
| 5,412,803 | 5/1995 | Bartow et al. | 395/200.01 |
| 5,414,700 | 5/1995 | Yang et al. | 370/276 |
| 5,423,002 | 6/1995 | Hart | 395/200.15 |
| 5,467,351 | 11/1995 | Baumert | 370/452 |
| 5,469,438 | 11/1995 | Baumert et al. | 370/432 |
| 5,541,911 | 7/1996 | Nilakantan et al. | 370/422 |
| 5,553,073 | 9/1996 | Barraclough et al. | 370/445 |

OTHER PUBLICATIONS

IBM, "Token-Ring Network: Architecture Reference", Selected Chapters, 1989.

Primary Examiner—James P. Trammell
Assistant Examiner—Tuan Q. Dam
Attorney, Agent, or Firm—Mark A. Haynes; Wilson, Sonsini, Goodrich & Rosati

[57] ABSTRACT

Traffic involved in maintaining a set of connection oriented sessions between end stations in a network is managed to optimize and reduce the polling traffic needed to maintain the connection oriented sessions across a common link between edge devices. At a first edge device, a member of a set of connection oriented sessions is selected as a polling session. Request polling traffic of that polling session is forwarded from a first edge device to the second edge device. All other polling traffic from other members of the set of connection oriented sessions is blocked at the first edge device. The set of connection oriented sessions is maintained in response to polling traffic of the selected polling session. A similar algorithm is executed at the second edge device to manage the traffic in both directions across the common link. The step of selecting a polling session for use across the intermediate link includes changing the polling session from one to another member of the set of connection oriented sessions from time to time. Preferably, this is done in a round robin fashion, so that each of the connection oriented sessions is utilized in turn for maintaining the intermediate link. The technique is based on dividing the connection oriented sessions into a first link session between the first edge device and a first end station coupled to the first edge device, an immediate session between the first and second edge devices, and a second link session between the second edge device and a second end station coupled to the second edge device.

36 Claims, 8 Drawing Sheets

IBM LAN Boundary Router: Central and Regional Site

IBM LAN Boundary Router: APPN

MANAGEMENT OF POLLING TRAFFIC IN CONNECTION ORIENTED PROTOCOL SESSIONS

BACKGROUND OF THE INVENTION

1. Field of the Invention

The present invention relates to management of traffic in communication networks and more particularly algorithms to reduce the amount of polling traffic needed to keep connection oriented protocol sessions alive, when traffic is flowing between two connected devices.

2. Description of Related Art

When two devices are physically connected via communications media, such as a local area network LAN or a wide area network WAN, the devices may use a connection oriented protocol such as specified in IEEE 802.2 Type 2 standards, to ensure a link layer reliable transfer of information from one device to another. Once devices using this connection oriented protocol have physical connectivity and the link layer protocol session has been set up, the devices are said to be ready for data transfer. When in the data transfer state, the devices can transfer information data as opposed to control data between each other based on the rules of the protocol being used. When the devices have no information to transfer, they typically continue to send polling traffic, such as the receive ready RR and receiver not ready protocol data units of the 802.2 Type 2 standard, between each other to keep the connection up and maintain data transfer ready state. In this manner, the devices are ready to transfer data immediately when required, without waiting for the completion of a set up process to get into a data transfer state before transferring information data.

According to these connection oriented protocols, when a device, such as device X, communicates with multiple other devices, such as devices A, B and C, device X will maintain a data transfer state session with each of the devices A, B and C. This means that polling traffic flows between the end stations in each of the data transfer sessions, that is between X and A, between X and B, and between X and C.

With today's advances in communications equipment, many possibilities exist for the physical connectivity between these devices. Thus, for example, these four devices might be physically connected using one LAN media and three WAN media. Also, these devices can be connected through intermediate communication devices, such as bridges, routers and switches. These intermediate devices connect the different physical media on which the devices X, A, B and C are located, together, so that the devices on different media can establish link layer sessions through the intermediate devices.

When an intermediate device is found between the end stations in the connection oriented protocol, the intermediate device will participate in each of the polling sessions. For illustration, consider the example in which the four devices X, A, B and C mentioned above, were supplemented with an intermediate device M between device X and the other three. This would result in connection oriented sessions from X to M to A, X to M to B and X to M to C, to provide the total of three end-to-end sessions. As can be seen, the polling traffic described earlier is concentrated on the link between X and M. This concentration of polling traffic can overload a communication media between X and M, limiting the performance of the connection oriented sessions.

FIGS. 1 through 4 illustrate prior art environments, in which the logical link control LCC layer connection oriented sessions might be established. Thus, FIG. 1 illustrates IEEE 802.2 logical link control Type 2 (LLC2) session traffic environment. In the environment illustrated, an IBM Systems Network Architecture (SNA) configuration is illustrated which utilizes a remote link, such as the Boundary Routing™ (Trademark of 3Com Corporation) architecture link. Thus, according to the architecture shown in FIG. 1, a leaf router 100 communicates across a WAN link 101 with a central router 102. The leaf router might be implemented using a NetBuilder Token Ring intermediate system, such as commercially available through 3Com Corporation of Santa Clara, Calif. Also, the central router 102 may be implemented using a 3Com NetBuilder II router, also available through 3Com Corporation. According to the Boundary Routing™ remote link paradigm, the wide area link 101 appears to the central router 102 as if it were an imaginary LAN segment represented by the loop 103 in the figure. In this environment, this LAN segment takes a form of a virtual Token Ring segment. In reality, the link 101 runs a serial protocol which can be a Point-to-Point Protocol PPP, Frame Relay FR or the so-called X.25 standard. For a detailed description of the Boundary Routing™ architecture, refer to literature available through 3Com Corporation for Boundary Routing ™ systems. See also, U.S. Pat. No. 5,423,002 by John H. Hart.

For the system illustrated in FIG. 1, the leaf node 100 is connected through a Token Ring LAN 104 to an end system, such as an IBM 3174 cluster controller 105 which is connected with one or more IBM 3270 display terminals 106.

At the central site, the central router 102 is connected through a Token Ring LAN 107 to a IBM 3745 Front End Processor FEP 108. The 3745 FEP 108 is connected to an IBM host system as known in the art. In the environment illustrated, the cluster controller 105 and the FEP 108 execute SNA using the LLC2 data link protocol. The LLC2 traffic from the cluster controller 105 is bridged by the leaf router 100 to the central router 102 and then forwarded to the 3745 FEP 108, and visa versa. At the LLC2 logical level, the connection oriented session runs between the cluster controller 105 and the FEP 108 as illustrated by arrow 110.

In this simplified SNA configuration, the traffic shown in FIG. 2 is representative of the LLC2 traffic executed to maintain the connection oriented session 110. Thus, the leaf node may send a test protocol data unit PDU, to which the central node responds with a test PDU. Next, the leaf node sends the XID exchange identification PDU. The node connected to the central site responds with a similar XID exchange identification PDU. Next, the central node sends the set asynchronous balanced mode extended SABME PDU to the leaf node. The leaf node responds with an unnumbered acknowledgment UA PDU. After receipt of the acknowledgment, the central node sends a receive ready RR poll command. The leaf node then responds with a receive ready RR final PDU. The central node may then send an information packet Info(1) to the leaf node. The leaf node responds with a RR acknowledgement packet. In order to maintain the connection oriented session alive, after a session time out, the central node will send a receive ready RR poll signal to the leaf node. The leaf node responds with a receive ready RR response. The central site will then wait for a time out, when it sends the RR poll PDU. The leaf node responds with the RR final response. The central node may send an information packet Info(2) to the leaf node. A time out might occur prior to receiving acknowledgement from the leaf node. In this case, the RR poll message is sent to the leaf node. The leaf node then responds with an RR final along with an acknowledgement in the PDU for the information packet. The central node may maintain the connection oriented session alive with more data or receive ready polling as is necessary. When an end station desires to disconnect the connection oriented session, a disconnect DISC PDU is sent to the leaf node. The leaf node responds to this disconnect message with an unnumbered acknowledgement UA.

Thus, FIG. 2 represents the normal SNA/LLC2 data flows which occur in a system such as shown in FIG. 1. All of the traffic, including the repeated receive ready polls and acknowledgements are sent across the WAN link 101.

FIG. 3 illustrates an alternative environment in which the logical LLC2 sessions are implemented according to the prior art. In particular, the system includes a leaf router 120 implemented for example using a 3Com NetBuilder Token Ring system executing the Boundary Routing™ remote link architecture. The leaf node is connected through the leaf router 120 across a WAN link 121 to a central router 122, implemented using, for example, a 3Com NetBuilder II. The central router 122 according to this architecture, treats the WAN link 121 as if it were an imaginary Token Ring LAN 123 coupled to the Token Ring LAN 124 that is physically connected to the leaf router 120. In this environment, an IBM LAN Server, or other PC file server, 125 is coupled to a Token Ring network 126 on a second port of the central router 122. An IBM end station, such as a requestor 127 running OS/2 or DOS is coupled to the Token Ring LAN 124 at the leaf router 120. The network software executed in this environment is known as NetBIOS. A logical NetBIOS LLC2 session 128 is established between the leaf node IBM LAN requestor 127 and the central node server 125. All of the LLC2 traffic is bridged as represented by the arrow 129 through the leaf router 120 and the central router 122 across the WAN link 121.

FIG. 4 illustrates the traffic which will be involved in the LLC2 session of FIG. 3 across the WAN link. The session begins with a leaf node sending a NetBIOS name query. The node on the central router responds with a NetBIOS name response. The leaf node then sends SABME PDU according to LLC2 protocol. The central node responds with a unnumbered acknowledgement UA to set up the connection. The central node then begins polling, with a receive ready RR poll. The leaf node will respond with a RR response. An information packet Info(1) can then be sent by the central node to the leaf node, which in turn acknowledges receipt of the packet with a RR PDU. After a poll time out, the central node will issue another RR poll message. The leaf node will respond with an RR response. After a subsequent time out, another RR poll message is sent by the central node, to which the leaf node responds with a RR response packet. A second information packet Info(2) may then be sent across the pre-established connection as illustrated. If no acknowledgement is received within the time out, the central node sends a RR poll message. The leaf node may then respond with a RR PDU that includes an acknowledgement and response to the poll. As long as a connection is established, more data and polling traffic will be sent across the session. To end a session, the central node sends a disconnect message DISC to the leaf node, which responds with a unnumbered acknowledgement UA.

Thus, FIG. 4 represents data flows for NetBIOS logical link control Type 2 sessions, which are encountered in the environment shown in FIG. 3. All of this traffic is sent across the WAN link 121.

WAN links are relatively expensive, so protocols which concentrate traffic on a WAN link such as the LLC2 protocols in the environments of FIGS. 1–4, increase cost. Also, the WAN link may act as a bottleneck for network traffic throughput, which can be significantly consumed by polling traffic or other control messages.

Another problem in these environments arises because some applications running SNA or NetBIOS are very timing sensitive. Delays or bottlenecks in the WAN or other intermediate link network may cause some applications to time out, since the LLC2 sessions are end-to-end. This problem is enhanced in configurations which rely on relatively slow wide area links to connect remote LANs together.

Therefore, an improved connection oriented protocol is desirable for systems in which the protocols communicate across a common link shared by a number of end users. In these environments, traffic is concentrated on the common link, timing sensitivity can suffer, and the expense of traffic on that common link is high.

SUMMARY OF THE INVENTION

The present invention provides for managing the traffic involved in maintaining a set of connection oriented sessions between end stations in a network. Particularly, in a network including a plurality of end stations coupled to a first edge device, and at least one end station coupled to a second edge device, and in which the first and second edge devices are connected across a common link, the method optimizes and reduces the polling traffic needed to maintain the connection oriented sessions across that common link between the edge devices.

According to one aspect of the invention, it can be characterized as a method based on selecting a member of a set of connection oriented sessions as a polling session at a first edge device. Request polling traffic of the selected polling session is forwarded from the first edge device to the second edge device. All other polling traffic from other members of the set of connection oriented sessions is blocked at the first edge device. The set of connection oriented sessions is maintained in response to polling traffic of the selected polling session. A similar algorithm is executed at the second edge device to manage the traffic in the opposite direction across the common link.

The invention can be characterized as based on dividing the connection oriented sessions into a first link session between the first edge device and a first end station coupled to the first edge device, and an immediate link session between the first and second edge devices and a second link session between the second edge device and a second end station coupled to the second edge device. For example, a given logical LLC Type 2 protocol session is divided into three links, and polling traffic is managed on the intermediate link session as mentioned above. The link between the first edge device and the first end station is terminated in the first edge device, and it is managed locally. A similar operation is used in the second edge device to manage the second link session.

According to another aspect of the invention, the step of selecting a polling session for use across the intermediate link includes changing the polling session from one to another member of the set of connection oriented sessions from time to time. Preferably, this is done in a round robin fashion, so that each of the connection oriented sessions is utilized in turn for maintaining the intermediate link.

In one approach, the step of selecting a polling session involves setting a session timer for the polling session. Upon expiration of a poll time out timer of a given connection oriented session, the algorithm determines whether the session timer has expired. If the session timer has expired, then the polling session is changed from one to another member of the managed set of the connection oriented sessions. This technique can be enhanced by changing the polling session to the given connection oriented session for which polling traffic was received, if no other member of the set has been waiting for selection as the polling session for a longer time.

According to another aspect, the step of selecting may include maintaining a skipped poll count for each member of the set, which indicates the number of blocked request polls for the session in the first edge device, and maintaining a count of the members of the set of connection oriented sessions which are being managed in this manner. Upon expiration of a poll time out timer for a given session, the number of skipped polls in the session is compared with the number of members in the managed set of sessions. If the number of skipped polls exceeds the number of members of the managed set of connection oriented sessions, then the polling session is changed.

The membership in the set of managed sessions is dynamic in one aspect of the invention. A given connection oriented session is added in the managed set of connection oriented sessions, if a successful poll and response are achieved for that session in a normal polling interchange. It remains in the managed set of connection oriented sessions until an event occurs which suggests that it should be removed. For instance, the polling session is removed from the set of connection oriented sessions if a timely response is not received to the poll which is sent. All of the members of a set are removed if a prespecified number of consecutive request polls do not receive timely responses, notwithstanding the changing of polling sessions over time.

The present invention can also be characterized as a method executed in the edge devices for managing the connection oriented sessions in a network that maintains a set of connection oriented sessions between end stations coupled to the first edge device and the second edge device. The method comprises:

dividing connection oriented sessions into a first link session between the first edge device and a first end station coupled to the first edge device, an intermediate link session between the first and second edge devices, and a second link session between the second edge device and a second end station coupled to the second edge device;

responding to request polls received at the first edge device in the first link session by sending responses to the first end station;

responding to request polls received at the second edge device in the second link session by sending responses to the second end station; and maintaining session time out timers for respective connection oriented sessions in the first edge device;

in response to a time out of a session time out timer for a current connection oriented session in the first edge device, determining whether the current connection oriented session is a member of the set;

if the current connection oriented session is not a member of the set, then sending a request poll to the second edge device in the intermediate link session for the current connection oriented session and waiting for a timely response poll, and upon receipt of a timely response poll, resetting the session time out timer;

if the current connection oriented session is a member of the set, then selecting, in the first edge device, a member of the set of connection oriented sessions as a polling session; and if the current connection oriented session is selected, then sending a request poll from the first edge device to the second edge device and waiting for a timely response poll in the intermediate link session for the current connection oriented session, and upon receipt of a timely response poll, resetting the corresponding session time out timer;

if the current connection oriented session is not selected, then resetting the corresponding session time out timer without sending a request poll in the intermediate link session for the current connection oriented session.

In a preferred system, the connection oriented sessions comprise the ANSI/IEEE standard 802.2 logical link control process. The polling traffic managed according to the algorithm described above comprises the receive ready RR request and reply traffic generated in this logical link control protocol. The communication medium between the edge devices consist of a serial protocol, wide area network, such as the PPP, frame relay or X.25 networks.

Accordingly, the present invention provides a smart polling algorithm utilized between intermediate devices in a network. When the intermediate devices know that a group of connection oriented sessions pass between them, the intermediate devices are able to change the link layer protocol flows on these sessions. This can be done by detecting those sessions which are the data transfer ready state, for the LLC2 environment, and performing the normal polling algorithms. All of these sessions in the normal polling state are put in a smart polling session. For those members of a set of sessions that are in the smart polling mode, the algorithm detects one of these sessions to do the polling for all of the sessions between the two intermediate devices. A different session is used for this purpose in a round robin fashion for each time period. This ensures that all of the sessions get polling coverage over a period of time. A valid smart polling reply keeps all of the sessions in the set in the smart polling mode. When one of the sessions fails in the smart poll, such as by not receiving a receiver ready RR reply, that session is put in the normal polling. When it is the normal polling mode, it does not participate in smart polling until a valid response to its own normal poll is received. When this occurs then the session is put back in the smart polling mode. Any physical layer detection of problems, such as link failure is responded to by placing all of the smart polling sessions into normal polling. When two consecutive smart polls fail, all smart polling sessions are converted to the normal polling state. In addition, sessions in a flow control mode or in the data transfer mode are kept in the normal polling mode.

This algorithm allows for all of the connection oriented sessions for multiple end stations through a common link to multiple devices on the other end of the link, to participate in this smart polling algorithm between the two intermediate nodes. Thus, the algorithm is not restricted to sessions which originate from a signal device.

The present invention provides a significant enhancement to the Boundary Routing™ remote link architecture in IBM environments which utilize the LLC2 connection oriented sessions. In particular, the amount of traffic on the WAN link is substantially reduced, particularly in environments that have a large number of sessions going on at the same time. The invention is also applicable to other network architectures which involve a common link across which a large number of connection oriented sessions are maintained.

Other aspects and advantages of the present invention can be seen upon review of the figures, the detailed description and the claims which follow.

DETAILED DESCRIPTION

Figure 5:
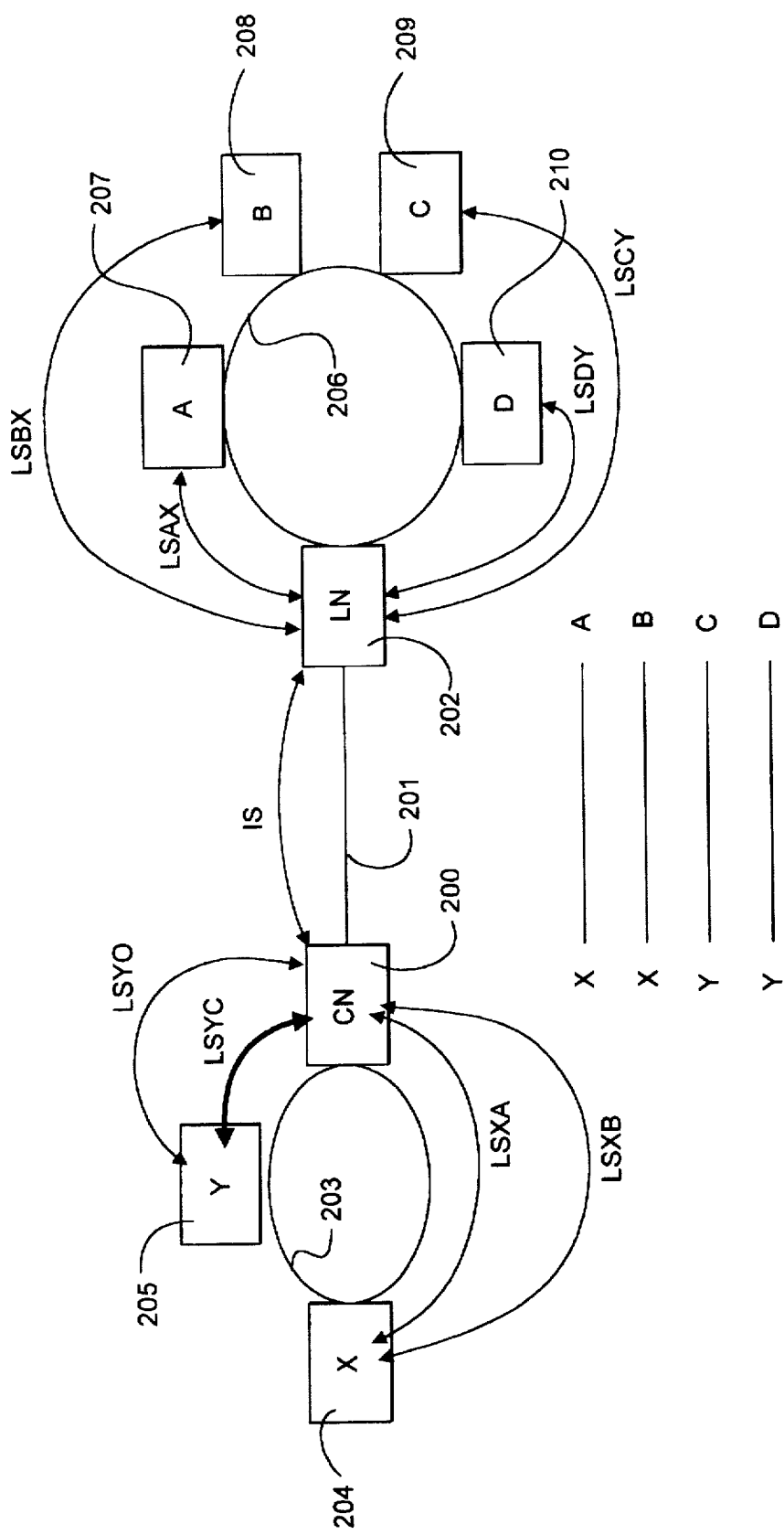
FIG. 5 is a simplified diagram showing the configuration of a network in which the present invention is utilized.
Figure 6:
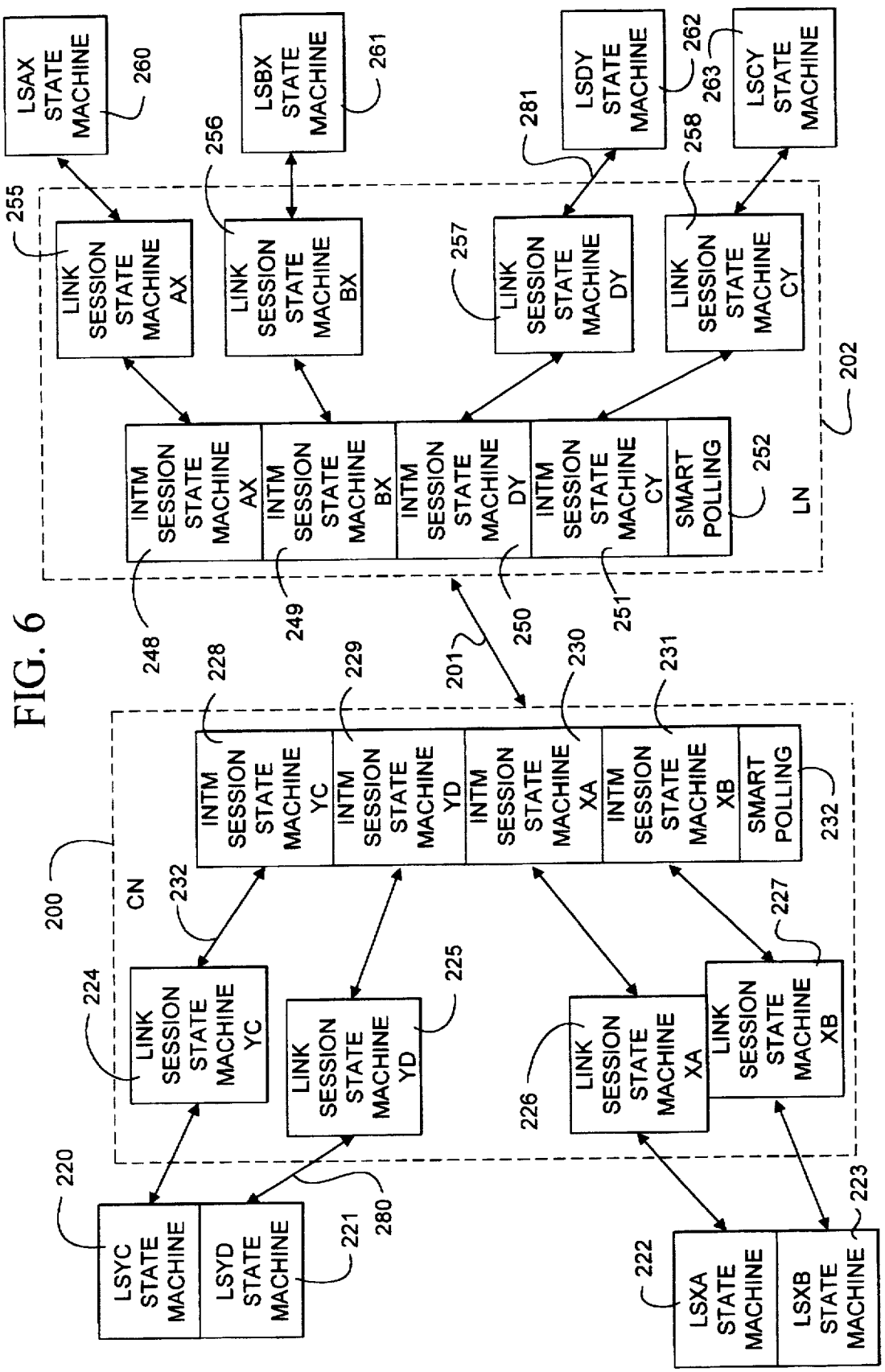
FIG. 6 illustrates the logical organization of the configuration of FIG. 5 according to one embodiment of the present invention.
Figure 7:
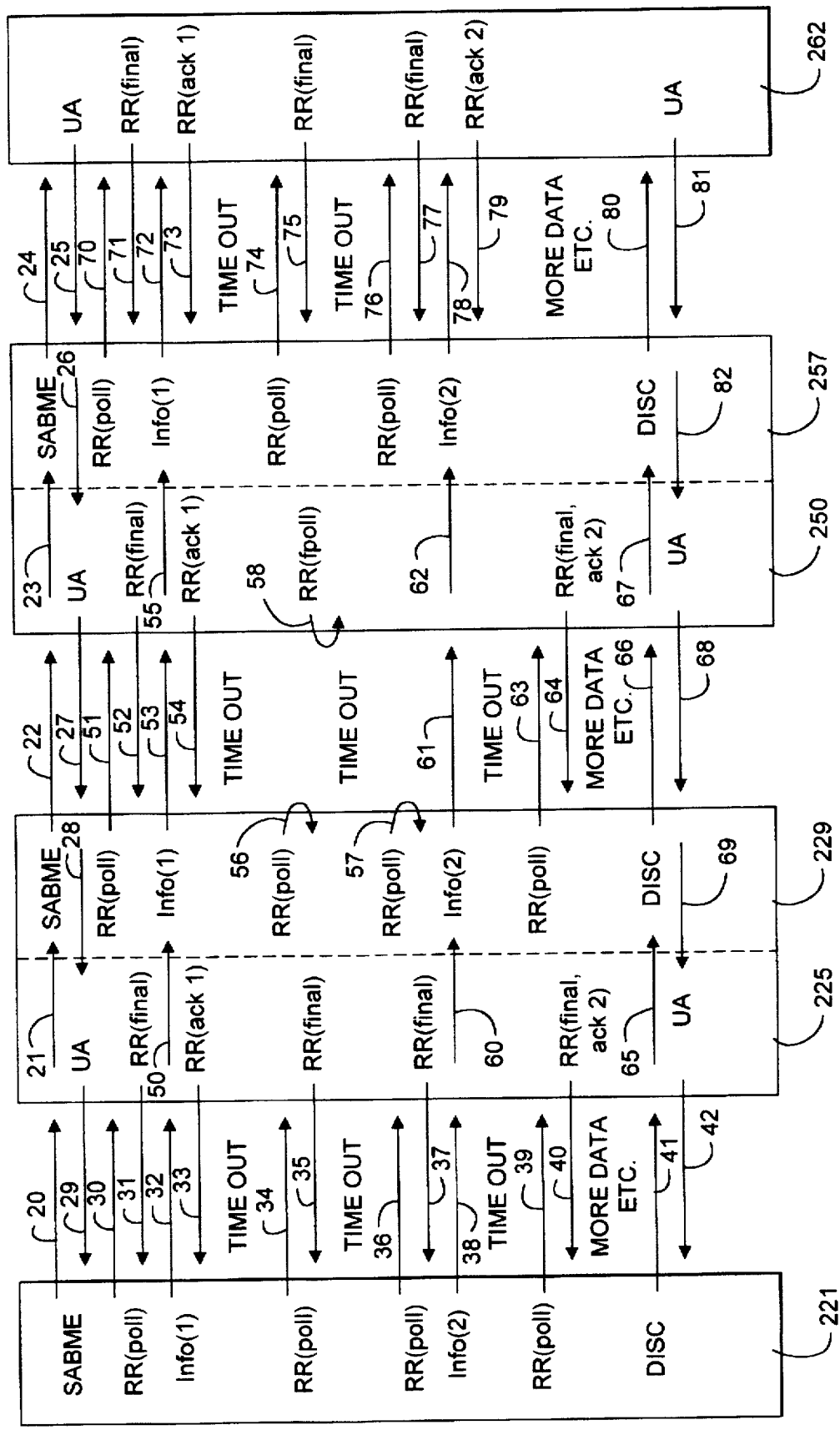
FIG. 7 illustrates the data flow for the system of FIG. 6.
Figure 9:
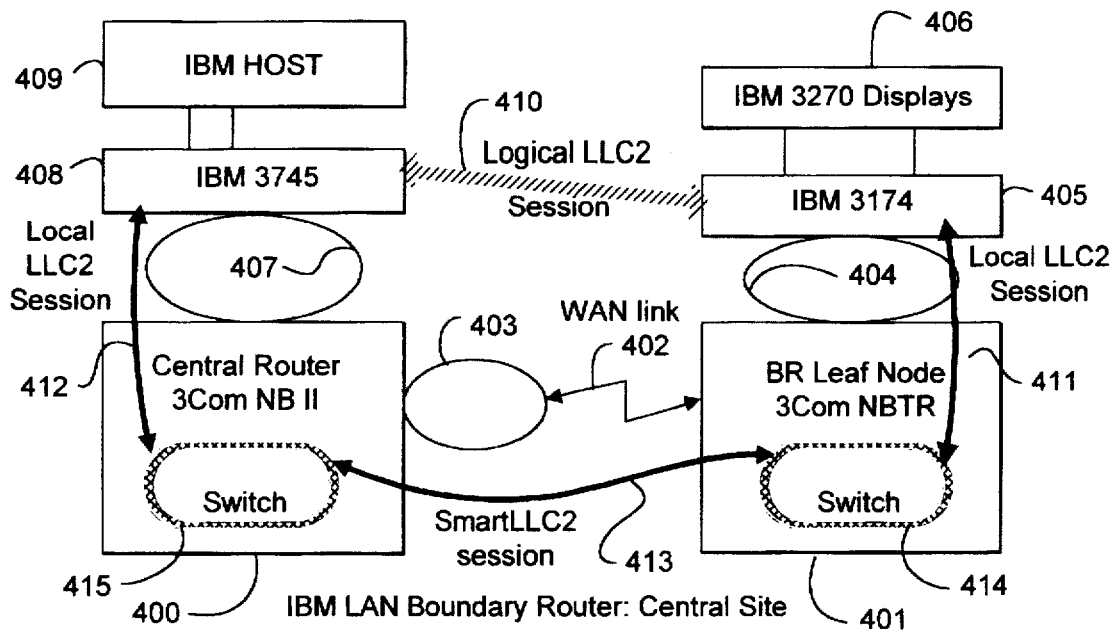
FIG. 9 is a diagram illustrating the divided LLC2 session with smart polling according to the present invention operating across a link between a leaf node and a central router in a Boundary Routing environment.
Figure 10:
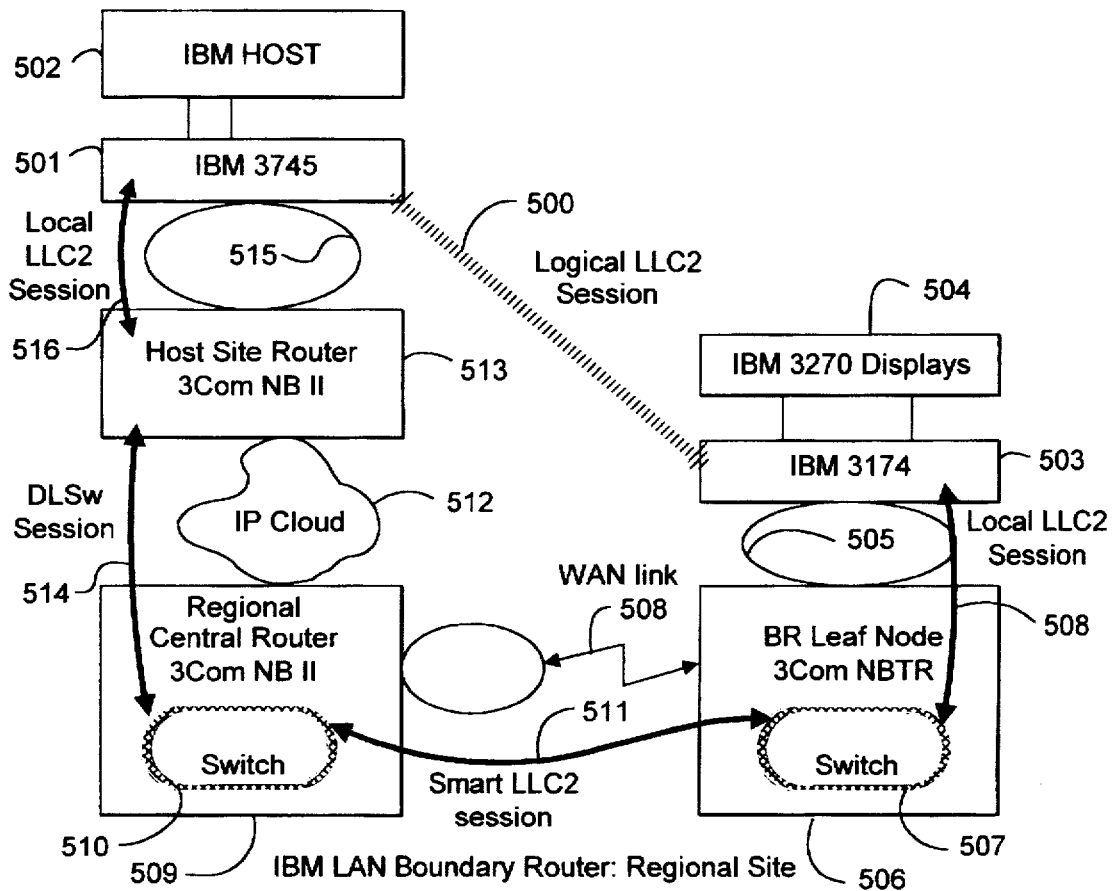
FIG. 10 shows another configuration, where a smart polling session is conducted between a leaf node and central router at a regional site.
Figure 11:
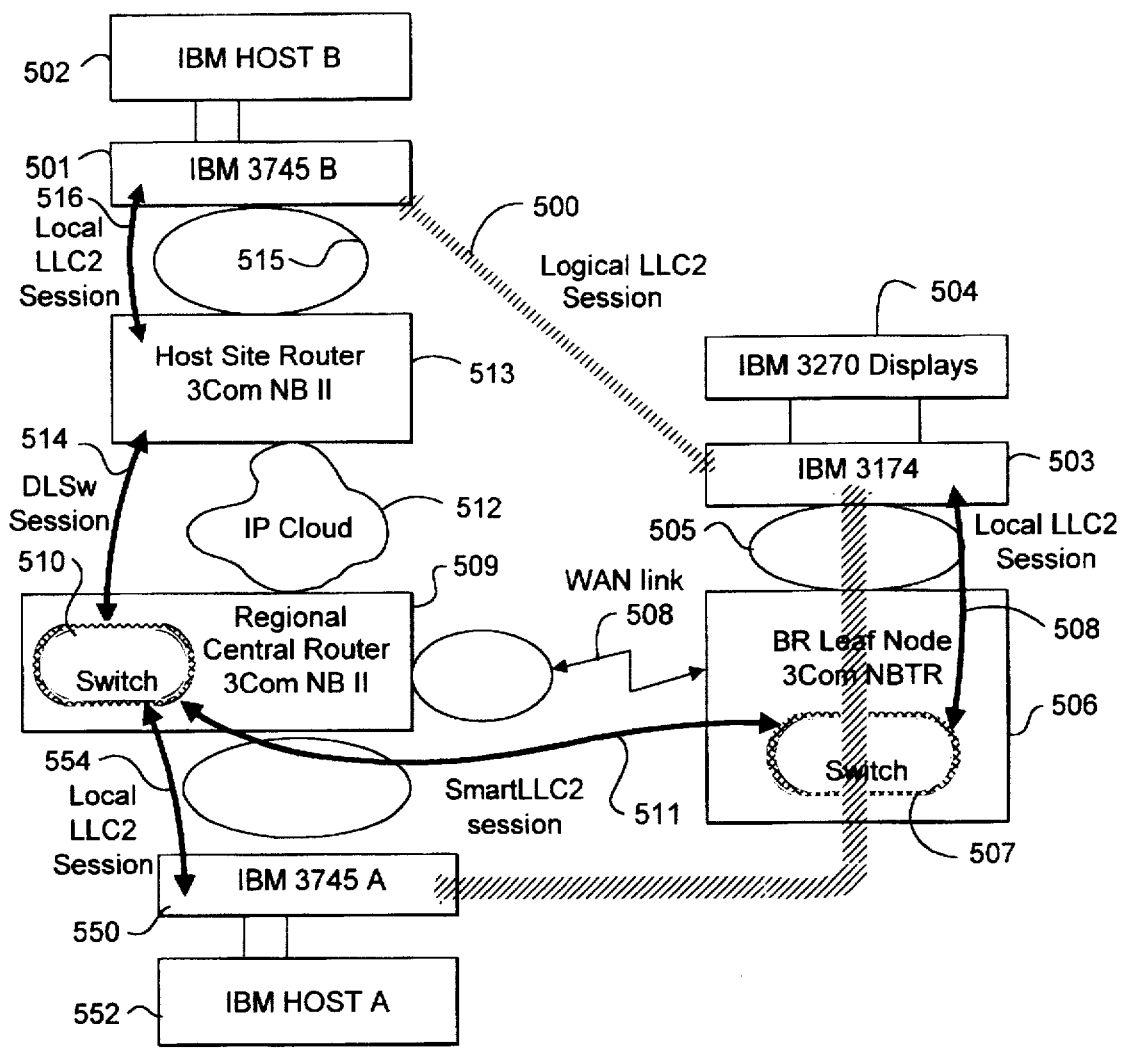
FIG. 11 is a diagram of another configuration in which two LLC2 sessions are conducted between a leaf node and a regional central router according to the present invention.

A detailed description of preferred embodiments of the present invention is provided with reference to the figures, of which prior art FIGS. 1–4 are discussed above. FIGS. 5–7 describe the basic structure of systems implementing the present invention, and FIGS. 9–11 illustrate representative environments in which the present invention operates.

The basic architecture of a system implementing the present invention is shown in FIG. 5. The system includes a central node 200 which is connected across a communication link 201 to a leaf node 202. A local area network 203 is connected to the central node 200. In this example, the local area network 203 is represented by a ring. Other local area network configurations can be utilized in this system. In the example shown in FIG. 5, the local area network 203 includes a first end station 204 and a second end station 205 which are labeled X and Y respectively. A leaf node 202 is also coupled to a local area network 206. This local area network is also represented by a ring in the drawing. Other configurations of local area networks could be utilized. The local area network 206 couples four end stations 207, 208, 209 and 210 labeled A, B, C and D respectively, to the leaf node 202.

The central node 200 might be implemented using a bridge/router system, a switch, or other network intermediate system. Devices in this class of devices are referred to as edge devices, as they provide interfaces between the link 201 and the local area network 203. Similarly, the leaf node 202 might be implemented with a bridge/router device, a bridge, or a switch. It may in a preferred embodiment implement the Boundary Routing™ remote link architecture discussed above. This device is also referred to as an edge device as it provides an interface between the link 201 and the local area network 206.

As discussed above, LLC2 traffic establishes end-to-end connections between the end stations. Thus, for example, a connection oriented session could be established between end station X and end station A, between end station X and end station B, between end station Y and end station C, and between end station Y and end station D. All of these connection oriented sessions pass traffic across the link 201 through the edge devices 200 and 202. According to the present invention these connection oriented sessions are divided into the first link session, an intermediate session and a second link session as illustrated in the figure. Thus, the session between station X and station A is divided into a link session LSXA between the end station X and the central node 200. An intermediate session IS between the central node 200 and the link node 202 and a link session LSAX between the leaf node 202 and the end station A. In a similar manner, the session between X and B is divided into a link session LSXB, and the intermediate session IS and a link session LSBX. The session between end station Y and end station C is divided into a link session LSYC, the intermediate IS, and a link session LSCY. The session between end station Y and end station D is divided into the link session LSYD, the intermediate session IS, and a link session LSDY. Thus, logical connection oriented sessions are terminated in the edge devices 200 and 202 in order to manage the traffic across the link 201 by establishing a shared smart polling intermediate session IS according to the present invention. As mentioned above, the intermediate session IS is managed such that the polling traffic from only one of the four connection oriented sessions described above is being conducted across the link 201 at a time. Meanwhile, the polling traffic between the end stations and the edge devices is maintained by the edge devices as if it was successfully being completed across the link. Other kinds of data involved in the connection oriented session such as information packets and set up packets are passed through the edge devices 200 and 202 between the end stations in a normal fashion.

FIG. 6 illustrates the logical organization of the end-to-end sessions for the configuration of FIG. 5. In FIG. 6, it can be seen that the end station Y is set up with two state machines, one state machine 220 for the link session between Y and C and another state machine 221 for the link session between Y and D. The end station X is set up with two state machines as well. Again, one state machine 222 is set up for the link session between X and A, at another state machine 223 is set up for the link session between X and B. In the central node 200, corresponding state machines are set up on the side adjacent to end stations. Thus, a state machine 224 is set up for the link session between Y and C in communication with the state machine 220. Link session state machine 225 is set up for the session between Y and D and communicates with the state machine 221. Similar state machines 226 and 227 are set up to communicate with the state machines 222 and 223, respectively, for the sessions between X and A, and X and B. Inside the central node, corresponding intermediate session state machines 228, 229, 230 and 231 are set up for each of the end-to-end sessions. Thus, state machine 220 is set up for the session between Y and C, and communicates within the central node 200 with the state machine 224 across an interprocess messaging protocol represented by the arrow 232. Similarly the intermediate session 229 is set up for the end-to-end session between Y and D, and communicates with the link session state machine 225. The intermediate session state machine 230 is set up for the end-to-end session between X and A and communicates with the link session state machine 226. Intermediate session state machine 231 is set up for the end-to-end session between X and B and communicates with the link session state machine 227.

The intermediate state machines 228, 229, 230 and 231 are managed with the smart polling process represented by block 232 in FIG. 6, and described in more detail below. The intermediate session state machines 228–231 communicate across the link 201 to the leaf node 202. In the leaf node 202, the corresponding intermediate session state machines 248–251 are set up for the end-to-end sessions between A and X, B and X, D and Y, and C and Y respectively. These four state machines 248–251 are controlled by the smart polling management process represented by block 252. Also, each of the end-to-end sessions includes a link session state machine. Thus, the session between A and X includes link session state machine 255. The session between B and X includes link session state machine 256. The session between D and Y includes link session state machine 257. The session between C and Y includes link session state machine 258. The link session state machines 255–258 communicate with the intermediate state machines 248–251 within the leaf node across respective interprocess messaging channels. The link session state machines 255–258 communicate with corresponding state machines at the end of stations A, B, C and D across the local area network, as illustrated in FIG. 5. Thus, a link session state machine 260 is set up in end station A for the session between A and X. Link session state machine 261 is set up in end station B for the session between B and X. Link session state machine 262 is set up in end station D for the session between D and Y. Finally, link session state machine 263 is set up in end station C for the end-to-end session between C and Y.

The process for implementing independent state machines within the central node 200 and leaf node 202 for each of the end-to-end sessions provides for local switching for the message packets being transmitted in each end-to-end session. According to the present invention, the session between any two stations, such as end station Y and end station D is divided in to three independently terminated communication links. The first link in this session between Y and D is represented by the arrow 280. The second link is represented by the arrow 201, and the third link is represented by the arrow 281. The links represented by arrows 280 and 281 are managed as if they were standard end-to-end sessions, terminating at the state machines 221 and 225, and at the state machines 257 and 262 respectively. All messages, except the receive ready RR messages and the reject messages according to the LLC2 standard, are passed by the interprocess communication channels from the state machine 257 to the state machine 250 or from the state machine 225 to the state machine 229 in this single end-to-end session. Thus, the supervisory messages receive ready RR and reject are blocked by the smart polling process of the present invention. Other messages are locally switched within the leaf node and central node to divide the session into three essentially independent sessions.

FIG. 7 represents the traffic flow for an end-to-end session according to the present invention. Thus, for the session between the state machine 221 at end station Y and the state machine 262 at end station D the traffic flows from state machine 221 to state machine 225. From state machine 225 it is passed to state machine 229 within the central node. The link between the central node and the leaf node involves passing messages between state machines 229 and 250. State machine 250 transfers messages to the state machine 257. State machine 257 manages transfer of messages from the leaf node to the end station state machine 262.

The session begins with a SABME message originating in state machine 221 and transmitted across the network on line 20 to the central node. The central node recognizes the SABME packet and sets up state machine 225. Meanwhile, the message is transmitted on line 21 in an interprocess channel to a state machine 229 which is also set up for the end-to-end session. This state machine 229 transmits the packet across the link between the leaf node and the central node represented by arrow 22 to the leaf node, which sets up state machine 250 to receive the packet and state machine 257 to manage transmission of the packet to the end station. The packet is transmitted across interprocess message channel 23 to the state machine 257 which transmits it across the local area network on line 24 to the end station, which sets up state machine 262. Successful set up of the state machine is indicated by the UA packet transmitted across line 25 to state machine 257 which passes the packet on the interprocess channel 26 to state machine 250. State machine 250 returns the packet across line 27 to state machine 229 at the central node which passes the packet on the interprocess channel 28 to state machine 225. State machine 225 forwards the packet on line 29 to state machine 221 to establish the end-to-end session. At that point, the state machine 221 and state machine 225 begin a normal LLC2 session terminated at state machines 221 and 225, respectively.

Figure 1:
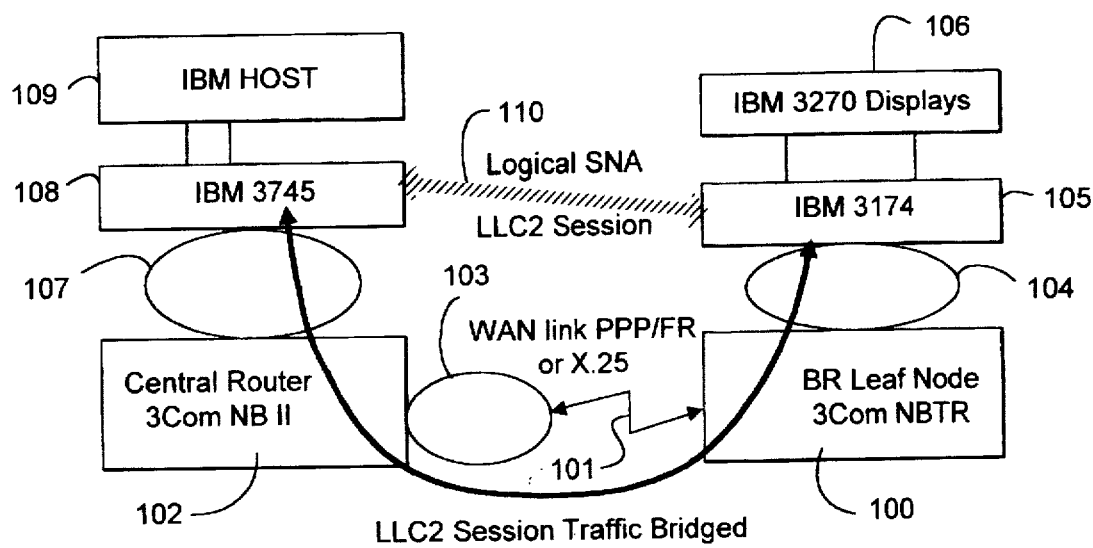
FIG. 1 is a block diagram illustrating a prior art network environment in which LLC2 connection oriented sessions are established.
Figure 2:
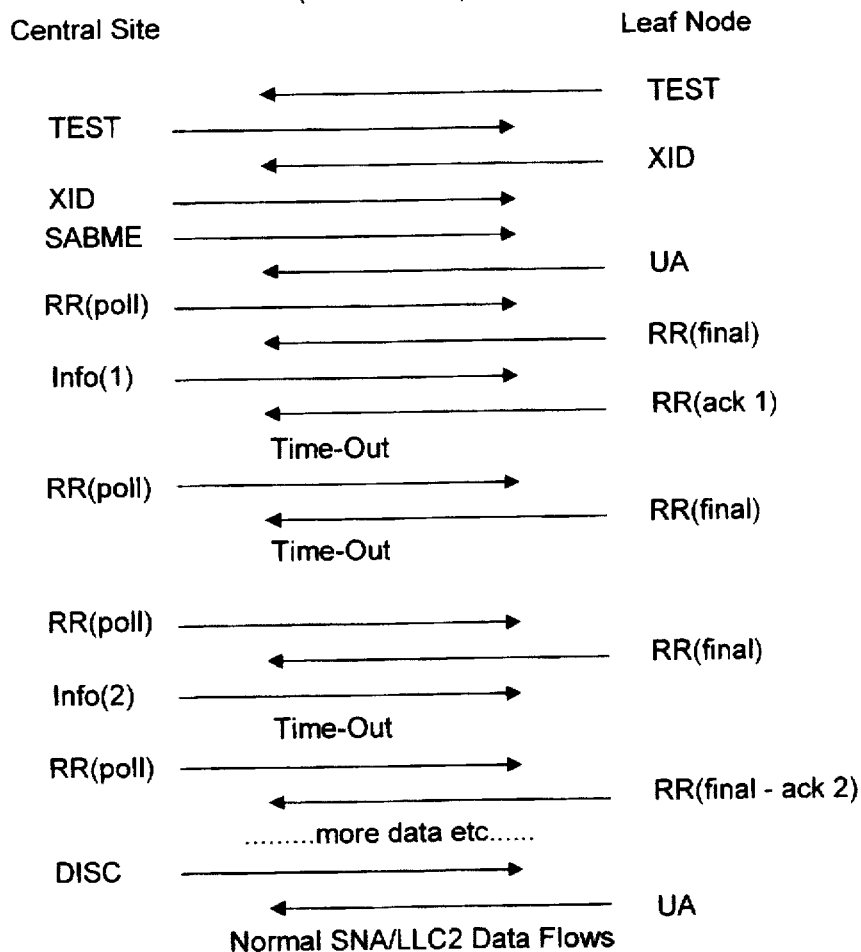
FIG. 2 illustrates the prior art data flows for the connection oriented session in the environment of FIG. 1.
Figure 3:
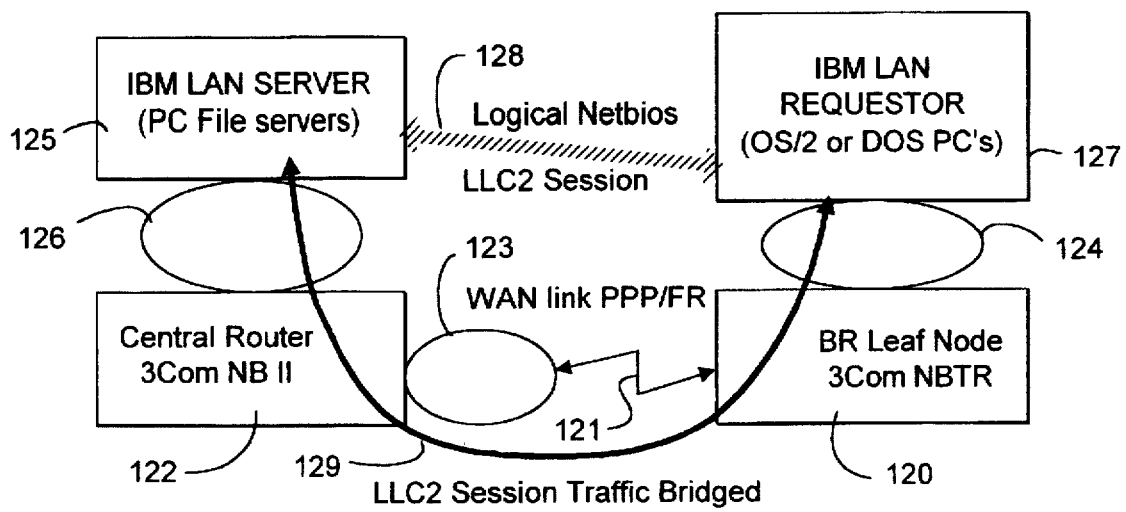
FIG. 3 illustrates an alternative prior art environment in which LLC2 sessions are implemented.
Figure 4:
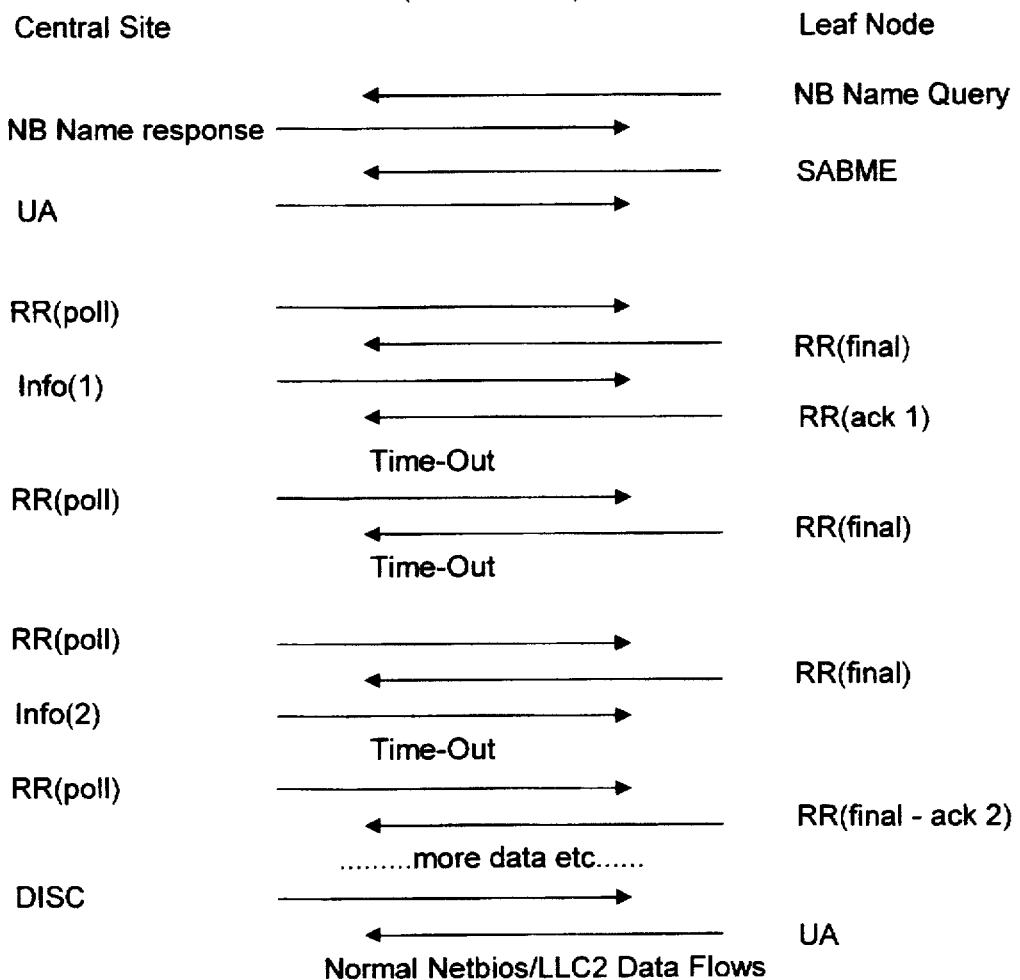
FIG. 4 illustrates the prior art data flow executed in the environment of FIG. 3 for the connection oriented sessions.

Thus, the state machine 221 sends a receive ready RR poll on line 30 and receives an acknowledgement receive ready RR final on line 31. Later, an information packet Info(1) is transferred on line 32 to the state machine 225 which acknowledges receipt on line 33. If a polling time out occurs, a receive ready RR poll is sent from state machine 221 on line 34 to the state machine 225 which responds with a receive ready RR final packet on line 35. A subsequent time out results in a similar packet exchange across lines 36 and 37. State machine 221 may send a second information packet Info(2) on line 38. If it does not receive a timely acknowledgement, it sends a receive ready RR poll at a subsequent time on line 39. The state machine 225 may then send a receive ready RR final and acknowledgement packet on line 40 to the state machine 221. More data and other messages are transferred between the two state machines. To terminate the session, one of the state machines sends the disconnect DISC message, such as the message across line 41. The state machine 225 responds to the messages on line 41 with an unnumbered acknowledgement UA across line 42 which breaks down the session. As can be seen, this data flow is basically the same data flow as is encountered in FIG. 2 starting with the SABME packet. Earlier packets in the interchange of FIG. 2 are passed through in the process of FIG. 7 just like the SABME packet and the UA packet.

The interprocess channel between state machines 225 and 229 in the central node is managed by the smart polling process of the present invention. That is, all packets except for receive ready RR polls and reject packets are passed from state machine 225 to state machine 229 on an interprocess channel. Thus, the info packet Info(1) which is received on line 32 is passed on interprocess channel 50 from state machine 225 to 229. State machine 229 manages transfer of the packet to the leaf node independent of the state machine 225.

Thus, the data flow between the central node and the leaf node can be seen in FIG. 7. After the UA packet on line 27 is transferred between the state machines 229 and 250 to set up the session, the state machine 229 sends a receive ready RR poll on line 51. State machine 250 responds with a receive ready RR final acknowledgement on line 52. If the Info(1) packet is received on the interprocess channel 50 prior to a time out, state machine 229 queues and sends out a packet on line 53 to the state machine 250. State machine 250 will issue a receive acknowledgement on line 54 when it successfully receives a packet. At the same time, it transfers the packet on an interprocess channel 55 to the state machine 257.

If a polling time out occurs in the state machine 229, then the smart polling algorithm of the present invention will block the standard poll and not send the poll to the leaf node except in special circumstances as described below. Thus, receive ready RR poll time outs occur and the polls are not always sent as indicated by the returning arrows 56 and 57 in the state machine 229, and the returning arrow 58 in the state machine 250.

At a later time, the information packet Info(2) on line 38 is received by the state machine 225 and passed on the interprocess channel 60 to state machine 229. State machine 229 queues and sends out the packet on line 61 to the state machine 250 which transfers the information packet on the interprocess channel 62 to the state machine 257. If the state machine 229 does not receive a timely acknowledgement, it will send a receive ready RR poll on line 63 to the state machine 250. The state machine 250, if it successfully received the packet, will respond to the receive ready RR poll with an acknowledgement on line 64. More data and other messages can be transferred as indicated. To terminate the session, when the state machine 225 receives the DISC packet from line 41, it transfers the message on the interprocess channel 65 to the state machine 229. State machine 229 forwards this packet on line 66 to state machine 250 which transfers it on the interprocess channel 67 to the state machine 257. The disconnect is acknowledged by a UA packet on line 68 which is transferred on the interprocess message channel 69 to state machine 225.

The session between the leaf node state machine 257 and the end station state machine 262 operates as a standard LLC2 session. Thus, after initialization of the session by the packets 24 and 25, the state machine 257 may send a receive ready RR poll on line 70. State machine 262 responds with a receive ready RR final acknowledgement on line 71. When the information packet Info(1) is received by the state machine 257, it is transferred on line 72 to state machine 262 which acknowledges receipt on line 73. If a time out occurs in the session between state machine 257 and 262, state machine 257 issues a receive ready RR poll as indicated on line 74. State machine 262 responds with a receive ready RR final acknowledgement as indicated by arrow 75. After a subsequent time out, another receive ready RR poll may be sent as indicated on line 76, to which the state machine 262 sends an acknowledgement as indicated on line 77. When state machine 257 receives an information packet Info(2) from the interprocess channel 62, it forwards the packet on line 78 to the state machine 262 which acknowledges receipt of the packet as indicated on line 79. More data and other messages may be transferred between the state machines 257 and 262, until the disconnect message is transferred by the state machine 257 on line 80 to state machine 262, and state machine 262 acknowledges with the UA acknowledgement on line 81. This UA acknowledgement on line 81 is transferred from state machine 257 across the interprocess channel 82 to state machine 250 which passes the packet down the line to terminate the end-to-end session.

Note that in the process between state machines 257 and 262, there is no time out after sending information packet Info(2) on line 78, like the time out encountered in the session between state machines 221 and 225 after the transfer on line 38. Thus, the acknowledgement on line 79 is received immediately by state machine 257. However, state machine 221 on the end station Y sends out a receive ready RR poll before receiving acknowledgement of the second information packet. This difference in the figure emphasizes the independence of the sessions between the end station and the central node, and between the leaf node and the end station. Thus, separately terminated end-to-end sessions are managed between the end stations and the intermediate sessions. The intermediate session is managed using the smart polling process of the present invention to control the amount of polling traffic across the link between the two networks.

The state machines 221, 225, 229, 250, 257 and 262 are all standard LLC2 state machines as specified according to the standard. The state machines 225 and 229 are modified only for the purposes of the smart polling algorithm as mentioned above. Receive ready RR polling messages and the reject messages received by the state machines 225 and 257 are not forwarded to the intermediate session state machines 229 and 250. Otherwise, all packets are passed between these sessions and transferred according to the normal rules of the LLC2 session being implemented.

The data flows illustrated in FIG. 7 apply to both SNA and NetBIOS environments. This applies because the only differences between the SNA and NetBIOS normal flows occur before establishment of the sessions, namely before the SABME/UA mode set exchange. Thus, the algorithm described herein applies for both cases.

In the example described in FIG. 7, the only flow that is not sent is a receive ready RR polls. Further, the RR poll is not sent out only in one case: when the sender has no outstanding unacknowledged data. In the figure, Info(2) is an example of data that is unacknowledged, and thus requires that the poll be sent represented by line 63.

The smart polling control algorithm according to the present invention operates as follows:

1. Port up/down status: when the hardware driver status at the WAN port of the edge device is port down, then all of the active LLC2 sessions are put in the normal polling state.
2. Sessions that are in the normal state will continue polling until they receive a poll final or are terminated. When a normal polling session receives a poll final, it is put into the smart polling state.
3. Force normal poll: at each poll time out, one of the active sessions that is in the smart polling state is selected to act as the polling session and is put into the normal polling state. The intent is to cycle through all of the active sessions that are in the smart polling state and put one into normal polling state at each poll time out.
4. Activity: if no poll final response is received for any session in two times the normal polling time out, then all of the sessions are put into the normal polling state.

For a session to be placed in the smart polling state: first, the port must be up, second, it must be in the normal polling state; third, LLC2 session activity is present on the port; fourth, no unacknowledged data is outstanding for the session; and fifth, the session is not in a flow control state.

If only one session is running, then the smart polling algorithm is of no benefit. For two sessions, the smart polling traffic is reduced by fifty percent. For thirty two sessions, the polling traffic is reduced by ninety six percent with this algorithm. In a majority of cases in which link problems are encountered, the algorithm detects the failures within an additional delay of two times of the poll time out, or the hardware detection time out which could be a few seconds. The algorithm result in cases, such as where a WAN link goes away or is noisy for only a short period of time causing the LLC2 session to be terminated at one end, but not the other end, which would not find out about the termination unless it were the current polling session. In such cases a worst case additional delay of the poll time out interval times the number of polling sessions that might occur for a given connection oriented session may happen before the failure is detected.

Figure 8:
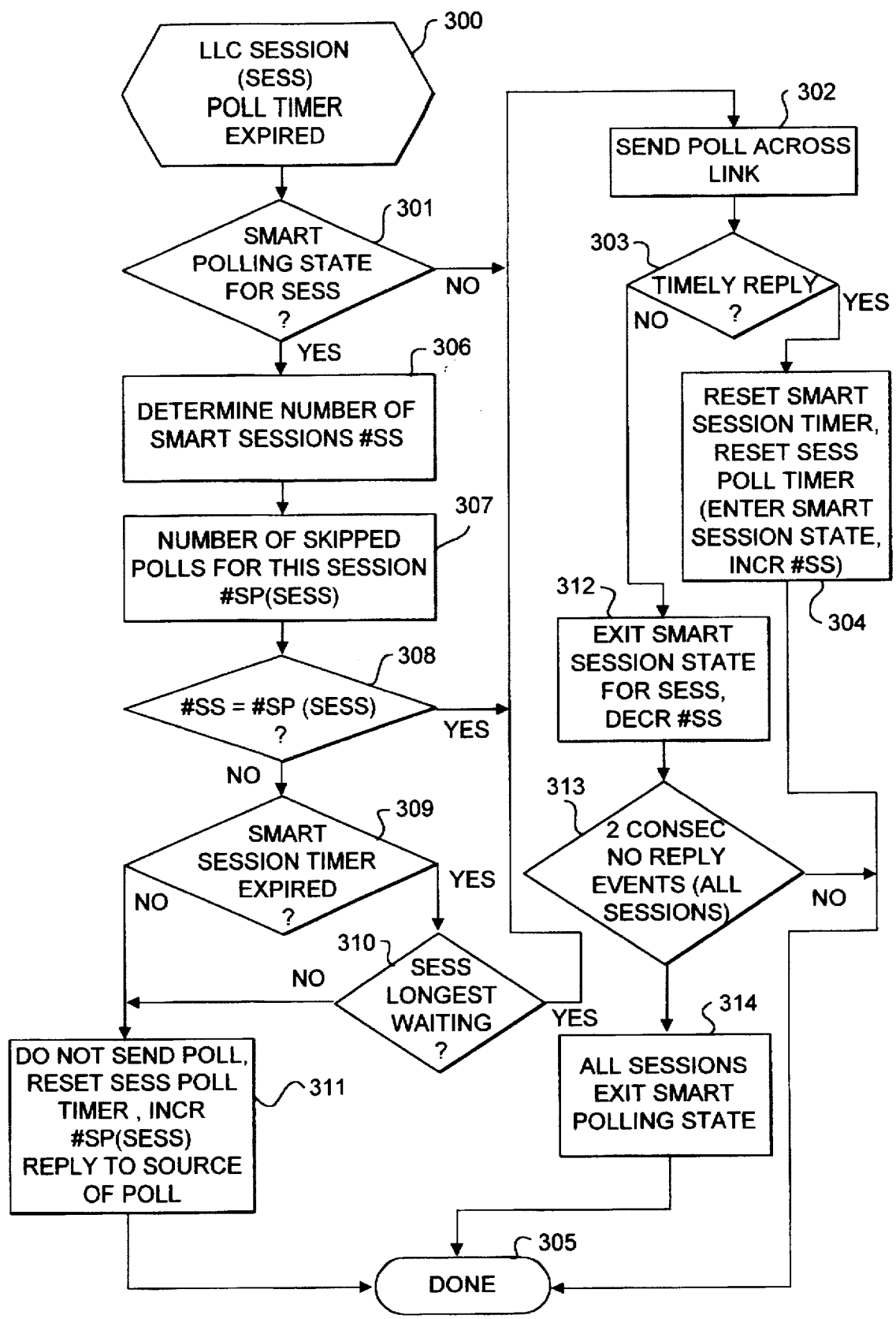
FIG. 8 is a flow chart of the process executed in the intermediate systems for managing the polling traffic according to the present invention.

FIG. 8 illustrates the process executed by state machines in the edge devices to manage the polling traffic according to the process of FIGS. 6 and 7. As mentioned above, once a session is started up, and enters the polling state, the state machine begins monitoring the poll timer maintained for each session. The process of FIG. 8 begins when the poll timer expires for a current session SESS (block 300). When this poll timer expires, the state machine determines whether the current session is in the smart polling state (block 301). If it is not in the smart polling state, then the process branches to block 302 where it sends a poll across the link to the other edge device. After sending the poll, the state machine waits for a timely reply across the link from the destination via the other edge device (block 303). If a timely reply is received, then the state machine resets a smart session timer (a session timer maintained for the set of managed sessions), resets the poll timer for the current session, and places the current session in the smart polling state. Further, if the current session was not already in the smart polling state, the number of smart sessions being conducted #SS is incremented (block 304). After this process of block 304, then the state machine is done for this poll interval (block 305).

If after expiration of the poll timer at block 300, it is determined that the current session is in the smart polling state, then the state machine determines the number of smart sessions currently in process (block 306). This number of smart sessions is represented by the variable #SS in the figure. Next, the algorithm determines the number of skipped polls for the current session #SP(SESS)(block 307). Next, the state machine will determine whether the number of smart sessions #SS is equal to the number of skipped polls for the current session #SP(SESS) at block 308. If the numbers match, such as if there are four connection oriented sessions which are placed in the smart polling state, and the current session has suffered blocked polls four times, then the algorithm branches to block 302, to send a poll for the current session across the link.

If at block 308 it is determined that the current session has not skipped a sufficient number of polls, then the algorithm determines whether the smart session timer has expired (block 309). This smart session timer is set to about one to three times the normal polling timer for the protocol, depending upon a particular implementation. If the timer has expired, then the algorithm determines whether the current session is the session in the set of managed sessions that has been waiting longest since one of its polls was sent across the link (block 310). If the session timer has expired and the current session is the longest waiting session, then the algorithm branches to block 302 to send the poll across the link.

If the smart session timer has not expired at block 309, or if the current session is not the longest waiting session a block 310, then the poll is blocked, the poll timer is reset for the current session, and the number of skipped sessions for the current session is incremented (block 311).

At block 311, the state machine also replies to the source of the current poll, maintaining the connection oriented session alive. After block 311, then the algorithm is done (block 305) for the current poll interval.

If the current session is selected as the polling session, by branching at blocks 301, 308 or 310 to block 302 and a poll is sent, then the algorithm proceeds to block 303 where a timely reply is awaited for the current session. If a timely reply is received, the algorithm branches to block 304 as before, resets the smart session timer and resets the session poll timer. If the current session is not already in the smart polling state, it is changed to that state as mentioned above.

If at block 303, the timely reply is not received, then the current session exits the smart polling state, and the number of connection oriented sessions in the smart polling state is decremented (block 312). Next, the algorithm determines whether two consecutive no reply events, involving different sessions in the managed set, have been detected (block 313). If two consecutive no reply events have not occurred, then the algorithm branches to block 305 and the current polling session is done. The current session will then be in the normal polling mode, and issue a polling request again, until the disconnect state is reached according to the standard protocol.

If at block 313, two consecutive no reply events are detected, then all of the sessions are taken out of the smart polling state (block 314), and the algorithm is done. This places all of the connection oriented sessions in the normal polling mode, and they will disconnect in the normal course, unless timely replies are received individually by them.

The sequence of steps in blocks 306 through 310 cause the polling session in the set of connection oriented sessions which are in the smart polling state to be changed in a round robin fashion. This ensures that each of the members of the set of connection oriented sessions in the smart polling state is utilized for the polling session in turn, confirming the connection through the remote edge device of the end station subject of that session with a regular process. It will be understood that other techniques could be utilized for determining whether the current session should be used as the polling session or not.

At block 310, the algorithm waits for the session which has been longest waiting between polls. This does not result in a significant delay in sending a poll across the link, because the smart session timer tested in block 309 is shared by all members of the set of connection oriented sessions in the smart polling state. Thus, these sessions will, in turn, pass through block 310 in the normal processing, until the longest waiting session is encountered.

Not shown in FIG. 8 is the fact that connection oriented sessions which are in the smart polling state are taken out of the smart polling state when an information packet is sent by one of the end stations of the sessions. These connection oriented sessions will re-enter the smart polling state upon successful sending of a poll, by execution of the process of block 304.

FIGS. 9–12 illustrate environments in which the smart polling process of the present invention might be executed, focusing on IBM environments running NetBIOS or SNA systems, in which the edge devices utilized are running under the Boundary Routing™ remote link architecture. However, as discussed above, other environments can take advantage of the present invention. These examples are representative of a preferred implementation of the invention.

FIG. 9 shows the environment discussed above with respect to FIG. 1, improved by the smart polling process of the present invention. Thus, the architecture in an IBM environment is shown relying on a central router 400 such as the NetBuilder II provided by 3Com Corporation. A leaf node router 401 is coupled to the central router 400 across a WAN link 402 under the Boundary Routing™ remote link architecture, which appears to the central router as if it were a LAN port schematically represented by the loop 403. The leaf node 401 is connected to a local area network 404 which includes an IBM 3174 cluster controller 405 and a plurality of IBM 3270 display terminals 406. Coupled to the central router 400 is a local area network 407 on which an IBM 3745 FEP 408 is connected. An IBM host system 409 is connected to the IBM 3745 FEP 408. Logical link control Type 2 sessions are implemented between the end stations on the network 404 and end stations on the network 407. Thus, a LLC2 session 410 may be established between the IBM 3174 405 and IBM 3745 408 as shown in the figure. According to the present invention this logical LLC2 session is divided into a local link session 411 between the IBM 3174 cluster controller 405 and the leaf node 401. A local link session 412 is established between the IBM 3745 FEP 408 and the central router 400. A smart polling intermediate session 413 is established between the leaf node 401 and the central router 400. Both the leaf node 401 and the central router 400 include a program which runs the smart polling algorithm discussed above with respect to FIG. 8. Thus, the leaf node includes the smart polling switch 414 and the central router 400 includes the smart polling switch for 415.

It will be appreciated that this configuration can also be used in the NetBIOS environment, and in other environments where logical connection oriented sessions can be established between end stations communicating through edge devices, such as the 3Com NetBuilder Token Ring and the 3Com NetBuilder II discussed with reference to FIG. 9.

As can be seen in FIG. 9, the LLC2 sessions are locally terminated at each NetBuilder, such as the leaf node NetBuilder 401 and the central router NetBuilder 400. One local LLC2 session is maintained between the FEP 408 and the central router 400. Another local session is maintained between the cluster controller 405 and the leaf node 401. An intermediate session 413 is maintained between the two edge devices at the leaf node 401 and the central node 400. Data received on the intermediate session 413 is forwarded by the switch 414, 415 as appropriate to the corresponding local session 411, 412. These three sessions then provide the total logical end-to-end LLC2 session 410. The two local sessions 411, 412 and the intermediate session 413 all use the same source and destination media and service access point SAP address. The end systems do not require address changes to implement the smart polling algorithm of the present invention. The LLC2 virtual ring number is used for the local LAN sessions where the LAN's 407 and 404 (and virtual LAN 403) are Token Rings as is typical in IBM environments. The switches for 414 and 415 operate like data link switches or tunneling ports, and thus provide the same promiscuous mode characteristics as appear on the Token Ring.

FIG. 10 illustrates another common configuration with a regional site. In FIG. 10, a logical LLC2 session 500 is established between an IBM 3745 FEP 501 coupled to an IBM host 502, and a IBM 3174 cluster controller 503 coupled to IBM 3270 displays 504. The communication between these end stations proceeds through a network having the configuration shown in FIG. 10. Thus, the cluster controller 503 is connected to a Token Ring LAN 505. A 3Com NetBuilder Token Ring leaf node 506 is coupled to the LAN 505. A smart polling switch 507 is executed in the leaf node edge device 506 as discussed above. Thus, a local LLC2 session 508 is established between the switch 507 and the cluster controller 503. The leaf node 506 is connected across a WAN link 508 in a Boundary Routing™ remote link configuration to a central router 509. The central router includes a smart polling switch 510. An intermediate LLC2 session 511 is established between the switch 507 and the switch 510 across the WAN link 508.

The regional router 510 is coupled to a network represented by the Internet Protocol IP cloud 512. This IP cloud 512 is coupled to a host site router 513 which may be implemented using a 3Com NetBuilder II. The switch 510 communicates using a data link switching DLSw session 514 (IETF RFC 1434 or IETF RFC 1795 TCP/IP session) with the host site router 513. The host site router 513 is also connected to a Token Ring LAN 515. This LAN is connected to the FEP 501 which participates in the LLC2 session 500. Thus, a local LLC2 session 516 is established between the FEP 501 and the host site router 513 and coupled between the host site router 513 and the regional router 509 through the data link switching TCP/IP session 514 as shown in the figure.

FIG. 11 is an extension of the configuration shown in FIG. 10. Thus, the common components have the same reference numbers and are not described again. The extension in FIG. 10 consists of a local IBM 3745 FEP 550 which is coupled to a Token Ring LAN 551. The Token Ring LAN 551 is connected directly to the regional router 509 in this embodiment. An IBM host 552 is coupled to the FEP 550 according to the standard environment. According to this extension, a logical LLC2 session 553 is maintained between the cluster controller 503 and the FEP 550. This session is maintained across the local link session 508, the intermediate session 511, and a local link session 554. These sessions are maintained by the switch 510 in the regional site router 509, and the switch 507 in the leaf router 506.

This architecture can be extended across additional leaf nodes. Thus, for example, two Boundary Routing™ remote link leaf nodes can be communicating through a central router, with smart polling exercised across one or both of the wide area links with that central router.

Figure 12:
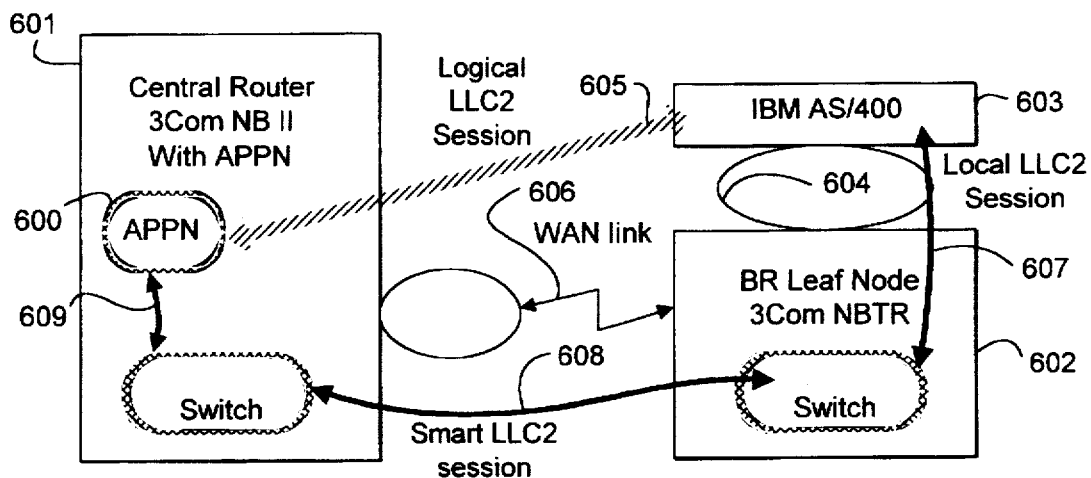
FIG. 12 illustrates the case in which the LLC2 session is conducted in an IBM advanced-peer-to-peer networking APPN environment.

FIG. 12 illustrates an alternative configuration in which an advanced peer-to-peer network APPN node is running in the central router. Thus, an APPN node 600 is running in a central router 601. A leaf node 602, and a station, such as an IBM AS/400 computer 603, are in communication across a local area network 604. A logical LLC2 session 605 is established between the APPN node 600 and the end station 603 at the leaf. Communication between the leaf node 602 and the central router 601 is established across a wide area network link 606, which is configured in this example in the Boundary Routing™ remote link architecture configuration. According to the present invention, the logical LLC2 session 605 is divided into a local session 607, an intermediate session 608, and a local session 609. The local session 609 is executed within the central router 601. This illustrates an example where the end station is within the central router itself, which also acts as the edge device for the smart polling algorithm. The connection of the end destination to the edge device is through a virtual data link switching port in this example, or otherwise carried out in the software of the central router. Thus, the edge device and end station may be in a single processing system with or without other network intermediate system functionality.

Accordingly, the present invention provides an algorithm which reduces the amount of polling traffic needed to keep connection oriented protocol sessions alive, when the traffic is flowing between two connected devices. The examples described involve the Boundary Routing™ remote link architecture, in which the edge devices communicate across a WAN link. Other communication media might be substituted within the spirit of the present invention. For instance, the edge devices may be connected to each other across a virtual LAN ATM backbone network, a local area network link, or other types of communication media. The invention is particularly suited to logical link control layer connection oriented sessions in the IBM environment where SNA or NetBIOS are prevalent network operating protocols. However, it is extendable to any LLC layer or higher layer connection oriented session in which the physical traffic across the link between edge devices can be managed with smart polling.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a network including a plurality of end stations coupled to a first edge device, and at least one end station coupled to a second edge device, and in which the first edge device is coupled to the second edge device through a communication medium, a method for maintaining a set of connection oriented sessions between the plurality of end stations coupled to the first edge device and at least one end station coupled to the second edge device, each of the set of connection oriented sessions generating request and response polling traffic, the method comprising:

selecting, in the first edge device, a member of the set of connection oriented sessions as a polling session;

sending request polling traffic of the polling session from the first edge device to the second edge device and deferring request polling traffic of the other members of the set of connection oriented sessions received at the first edge device from the plurality of end stations; and maintaining the set of connection oriented sessions in response to response polling traffic of the polling session in the first edge device.

2. The method of claim 1, including:

selecting, in the second edge device, a member of the set of connection oriented sessions as a second polling session;

sending request polling traffic of the second polling session from the second edge device to the first edge device and deferring request polling traffic of the other members of the set of connection oriented sessions received at the second edge device from the at least one end station; and maintaining the set of connection oriented sessions in response to response polling traffic of the second polling session in the second edge device.

3. The method of claim 1, wherein the step of selecting comprises:

changing the polling session from one to another member of the set of connection oriented sessions from time to time.

4. The method of claim 1, wherein the step of selecting comprises:

changing the polling session from one to another member of the set of connection oriented sessions in a round robin fashion.

5. The method of claim 1, wherein the step of selecting includes:

setting a session timer for the polling session and member polling timers for members of the set of connection oriented sessions;

determining upon expiration of the member polling timer for a given connection oriented session in the set, whether the session timer is expired; and in response to expiration of the session timer, changing the polling session from one to another member of the set of connection oriented sessions.

6. The method of claim 5, including:

changing the polling session to the given connection oriented session if no other member of the set has been waiting for selection as the polling session for a longer time.

7. The method of claim 1, wherein the step of selecting includes:

maintaining member polling timers for members of the set of connection oriented sessions;

maintaining a skipped poll count for each member of the set, the skipped poll count indicating a number of blocked request polls in the first edge device, and a member count indicating a number of the members of the set;

comparing upon expiration of the member polling timer for a given connection oriented session in the set, the member count to the skipped poll count of the given connection oriented session; and changing the polling session to the given connection oriented session in response to the comparison.

8. The method of claim 1, including:

removing the polling session from the set of connection oriented sessions if a timely response is not received.

9. The method of claim 8, including:

removing all connection oriented sessions from the set if two consecutive request polls do not receive timely responses.

10. The method of claim 9, including:

making a connection oriented session a member of the set of connection oriented sessions in response to a timely response to a request poll.

11. The method of claim 1, including:

making a connection oriented session a member of the set of connection oriented sessions in response to a timely response to a request poll.

12. The method of claim 1, wherein the connection oriented session comprises a logical link control (LLC) layer session.

13. The method of claim 12, wherein the request and response polling traffic comprises receive ready (RR) request and response traffic compliant with ANSI/IEEE Standard 802.2 Logical Link Control.

14. The method of claim 1, wherein the communication medium between the first and second edge devices comprises a serial protocol, wide area network.

15. In a network including a plurality of end stations coupled to a first edge device, and at least one end station coupled to a second edge device, and in which the first edge device is coupled to the second edge device through a communication medium, a method for maintaining a set of connection oriented sessions between the plurality of end stations coupled to the first edge device and at least one end station coupled to the second edge device, each of the set of connection oriented sessions generating request and response polling traffic in response to session time out conditions, the method comprising:

in response to a time out of a session time out timer for a current connection oriented session in the first edge device, determining whether the current connection oriented session is a member of the set;

if the current connection oriented session is not a member of the set, then sending a request poll to the second edge device for the current connection oriented session and waiting for a timely response poll, and upon receipt of a timely response poll, resetting the session time out timer, if the current connection oriented session is a member of the set, then selecting, in the first edge device, a member of the set of connection oriented sessions as a polling session; and if the current connection oriented session is selected, then sending a request poll from the first edge device to the second edge device and waiting for a timely response poll, and upon receipt of a timely response poll, resetting the session time out timer, if the current connection oriented session is not selected, then resetting the session time out timer without sending a request poll.

16. The method of claim 15, wherein the step of selecting a member of the set of connection oriented sessions as a polling session, includes:

setting a session set timer for the polling session;

determining upon expiration of the session time out timer for the current connection oriented session, whether the session set timer is expired; and in response to expiration, changing the polling session to the current connection oriented session.

17. The method of claim 16, including:

changing the polling session to the current connection oriented session if no other member of the set has been waiting for selection as the polling session for a longer time.

18. The method of claim 15, wherein the step of selecting a member of the set of connection oriented sessions as a polling session, includes:

maintaining a skipped poll count for each member of the set, the skipped poll count indicating a number of blocked request polls in the first edge device, and a member count indicating a number of the members of the set;

comparing, upon expiration of the session time out timer for the current connection oriented session in the set, the member count to the skipped poll count of the current connection oriented session; and changing the polling session to the current connection oriented session in response to the comparison.

19. The method of claim 15, including:

removing the polling session from the set of connection oriented sessions if a timely response is not received.

20. The method of claim 19, including:

removing all connection oriented sessions from the set if two consecutive request polls do not receive timely responses.

21. The method of claim 19, including, if the current connection oriented session is not a member of the set, then making the current connection oriented session a member of the set of connection oriented sessions in response to a timely response to a request poll.

22. The method of claim 15, including, if the current connection oriented session is not a member of the set, then making the current connection oriented session a member of the set of connection oriented sessions in response to a timely response to a request poll.

23. The method of claim 15, wherein the connection oriented session comprises a logical link control (LLC) layer session.

24. The method of claim 23, wherein the request and response polling traffic comprises receive ready (RR) request and response traffic compliant with ANSI/IEEE Standard 802.2 Logical Link Control.

25. The method of claim 15, wherein the communication medium between the first and second edge devices comprises a serial protocol, wide area network.

26. In a network including a plurality of end stations coupled to a first edge device, and at least one end station coupled to a second edge device, and in which the first edge device is coupled to the second edge device through a communication medium, a method for maintaining a set of connection oriented sessions between the plurality of end stations coupled to the first edge device and at least one end station coupled to the second edge device, each of the set of connection oriented sessions generating request and response polling traffic in response to session time out conditions, the method comprising:

dividing connection oriented sessions into a first link session between the first edge device and a first end station coupled to the first edge device, an intermediate link session between the first and second edge devices, and second link session between the second edge device and a second end station coupled to the second edge device;

responding to request polls received at the first edge device in the first link session by sending responses to the first end station;

responding to request polls received at the second edge device in the second link session by sending responses to the second end station; and maintaining session time out timers for respective connection oriented sessions in the first edge device;

in response to a time out of a session time out timer for a current connection oriented session in the first edge device, determining whether the current connection oriented session is a member of the set;

if the current connection oriented session is not a member of the set, then sending a request poll to the second edge device in the intermediate link session for the current connection oriented session and waiting for a timely response poll, and upon receipt of a timely response poll, resetting the session time out timer, if the current connection oriented session is a member of the set, then selecting, in the first edge device, a member of the set of connection oriented sessions as a polling session; and if the current connection oriented session is selected, then sending a request poll from the first edge device to the second edge device and waiting for a timely response poll in the intermediate link session for the current connection oriented session, and upon receipt of a timely response poll, resetting the corresponding session time out timer, if the current connection oriented session is not selected, then resetting the corresponding session time out timer without sending a request poll in the intermediate link session for the current connection oriented session.

27. The method of claim 26, wherein the first link session, intermediate link session and second link session of the connection oriented sessions comprise logical link control (LLC) layer sessions.

28. The method of claim 27, wherein the request polls comprise receive ready (RR) requests, and the responses comprise receive ready (RR) replies complaint with ANSI/IEEE Standard 802.2 Logical Link Control, and wherein other traffic is passed through the first link session, intermediate link session and second link session of the connection oriented sessions.

29. The method of claim 26, wherein the step of selecting a member of the set of connection oriented sessions as a polling session, includes:

setting a session set timer for the polling session;

determining upon expiration of the session time out timer for the current connection oriented session, whether the session set timer is expired; and in response to expiration, changing the polling session to the current connection oriented session.

30. The method of claim 26, including:

changing the polling session to the current connection oriented session if no other member of the set has been waiting for selection as the polling session for a longer time.

31. The method of claim 26, wherein the step of selecting a member of the set of connection oriented sessions as a polling session, includes:

maintaining a skipped poll count for each member of the set, the skipped poll count indicating a number of blocked request polls in the first edge device, and a member count indicating a number of the members of the set;

comparing, upon expiration of the session time out timer for the current connection oriented session in the set, the member count to the skipped poll count of the current connection oriented session; and changing the polling session to the current connection oriented session in response to the comparison.

32. The method of claim 26, including:

removing the polling session from the set of connection oriented sessions if a timely response is not received.

33. The method of claim 32, including:

removing all connection oriented sessions from the set if two consecutive request polls do not receive timely responses.

34. The method of claim 32, including, if the current connection oriented session is not a member of the set, then making the current connection oriented session a member of the set of connection oriented sessions in response to a timely response to a request poll.

35. The method of claim 26, including, if the current connection oriented session is not a member of the set, then making the current connection oriented session a member of the set of connection oriented sessions in response to a timely response to a request poll.

36. The method of claim 26, wherein the communication medium between the first and second edge devices comprises a serial protocol, wide area network.

* * * * *